United States Patent
Bian et al.

(10) Patent No.: US 11,424,806 B2
(45) Date of Patent: Aug. 23, 2022

(54) METHOD AND DEVICE FOR DETERMINING PRECODING, METHOD AND DEVICE FOR DETECTING DATA, STORAGE MEDIUM AND ELECTRONIC DEVICE

(71) Applicant: ZTE Corporation, Guangdong (CN)

(72) Inventors: Luanjian Bian, Shenzhen (CN); Bo Dai, Shenzhen (CN); Kun Liu, Shenzhen (CN); Weiwei Yang, Shenzhen (CN)

(73) Assignee: ZTE CORPORATION, Guangdong (CN)

(*) Notice: Subject to any disclaimer, the term of this patent is extended or adjusted under 35 U.S.C. 154(b) by 0 days.

(21) Appl. No.: 17/388,939

(22) Filed: Jul. 29, 2021

(65) Prior Publication Data

US 2022/0123813 A1    Apr. 21, 2022

Related U.S. Application Data

(63) Continuation of application No. PCT/CN2020/073245, filed on Jan. 20, 2020.

(30) Foreign Application Priority Data

Jan. 30, 2019 (CN) .......................... 201910093035.7

(51) Int. Cl.
*H04B 7/06* (2006.01)
*H04B 7/0456* (2017.01)
(Continued)

(52) U.S. Cl.
CPC ......... *H04B 7/0639* (2013.01); *H04B 7/0478* (2013.01); *H04W 72/0446* (2013.01); *H04L 1/18* (2013.01)

(58) Field of Classification Search
CPC ............... H04B 7/0639; H04B 7/0478; H04W 72/0446; H04L 1/18
See application file for complete search history.

(56) References Cited

U.S. PATENT DOCUMENTS 10,993,255 B2 * 4/2021 Kim .................. H04W 72/1289
2013/0021897 A1   1/2013 Wu et al.
(Continued)

FOREIGN PATENT DOCUMENTS

CN      102208969 A      10/2011
CN      104009785 A       8/2014
(Continued)

OTHER PUBLICATIONS

International Search Report for priority application No. PCT/CN2020/073245, dated Apr. 20, 2020, 3p, in Chinese language.
(Continued)

*Primary Examiner* — Jaison Joseph
(74) *Attorney, Agent, or Firm* — Crowell & Moring LLP

(57) ABSTRACT

Provided are a method and device for determining precoding, a method and device for detecting data, a storage medium and an electronic device. The method for determining precoding includes: receiving, by a first communication node, a precoding matrix indicator (PMI) sent by a second communication node; and determining a precoding matrix used on a control channel according to the PMI and a precoding parameter; where the precoding parameter includes at least one of: a PMI delay, the number of repetitions of the control channel, an aggregation level of the control channel, a candidate resource of the control channel, a starting physical resource block (PRB) sequence number of the control channel, a repetition resource group of the control channel, or a PRB set of the control channel.

18 Claims, 3 Drawing Sheets

(51) Int. Cl.
*H04W 72/04* (2009.01)
*H04L 1/18* (2006.01)

(56) References Cited

U.S. PATENT DOCUMENTS

| | | | | |
|---|---|---|---|---|
| 2016/0013905 | A1* | 1/2016 | Seo | H04B 7/0456 |
| | | | | 370/329 |
| 2017/0374640 | A1 | 12/2017 | Kim et al. | |
| 2020/0382191 | A1* | 12/2020 | Seo | H04J 11/00 |
| 2021/0021318 | A1 | 1/2021 | Li et al. | |
| 2022/0124711 | A1* | 4/2022 | Zhou | H04W 16/14 |

FOREIGN PATENT DOCUMENTS

| | | |
|---|---|---|
| CN | 107733494 A | 2/2018 |
| CN | 108259074 A | 7/2018 |

OTHER PUBLICATIONS

English language translation of the International Search Report for priority application No. PCT/CN2020/073245, dated Apr. 20, 2020, 2p.

Written Opinion of the International Search Report for priority application No. PCT/CN2020/073245, dated Apr. 20, 2020, 4p, in Chinese language.

Concise Explanation of Relevance of the Written Opinion of the International Search Authority for priority application No. PCT/CN2020/073245, 1p.

Ericsson, "MPDCCH performance improvement in LTE-MTC", 3GPP TSG-RAN WG1 Meeting #94bis, Oct. 8-12, 2018, R1-1810190, 3p, China.

ZTE, "Discussion on MPDCCH performance improvement", 3GPP TSG RAN WG1 Meeting #94bis, Oct. 8-12, 2018, R1-1810504, 6p, China.

Qualcomm Incorporateed, "Usage of CRS for MDPCCH", 3GPP TSG-RAN WG1 Meeting #94bis, Oct. 8-12, 2018, R1-1810919, 4p, China.

Nokia et al., "MPDCCH performance improvement", 3GPP TSG RAN WG1 Meeting #94bis, Oct. 8-12, 2018, R1-1811062, 2p, China.

* cited by examiner

METHOD AND DEVICE FOR DETERMINING PRECODING, METHOD AND DEVICE FOR DETECTING DATA, STORAGE MEDIUM AND ELECTRONIC DEVICE

This application is a continuation of International Application No. PCT/CN2020/073245, filed Jan. 20, 2020, which claims priority to Chinese Patent Application No. 201910093035.7, filed Jan. 30, 2019, the entireties of both of which are hereby incorporated by reference.

TECHNICAL FIELD

The present disclosure relates to the field of communications and, for example, a method and device for determining precoding, a method and device for detecting data, a storage medium and an electronic device.

BACKGROUND

In the machine type communication (MTC), the MTC-physical downlink control channel (MPDCCH) sends data in a precoding manner. In the MPDCCH of release-15, a receiving end adopts the channel estimation based on a demodulation reference signal (DMRS). For the DMRS-based channel estimation, the precoding is transparent to the receiving end, and the receiving end can complete the data demodulation without knowing a precoding matrix used by the data.

In release-16, the receiving end can enhance the performance of the MPDCCH by using a cell-specific reference signal (CRS), and its specific operation is that the receiving end adopts the CRS and DMRS joint channel estimation. However, the CRS and DMRS joint channel estimation requires the terminal to know the precoding matrix used for sending data. When a precoding matrix indicator (PMI) feedback is enabled, a transmitting end may not use the fed back precoding matrix, so it is difficult for the receiving end to determine the precoding matrix.

SUMMARY

Embodiments of the present disclosure provide a method and device for determining precoding, a method and device for detecting data, a storage medium and an electronic device to at least solve the problem in the related art that when the receiving end adopts the CRS and DMRS joint channel estimation, it is difficult for the receiving end to determine a precoding matrix.

According to an embodiment of the present disclosure, a method for determining precoding is provided. The method includes steps described below, a first communication node receives a PMI sent by a second communication node; and a precoding matrix used on a control channel is determined according to the PMI and a precoding parameter; the precoding parameter includes at least one of: a PMI delay, the number of repetitions of the control channel, an aggregation level of the control channel, a candidate resource of the control channel, a starting physical resource block (PRB) sequence number of the control channel, a repetition resource group of the control channel, or a PRB set of the control channel.

In an embodiment, the method includes steps described below, the first communication node receives the PMI estimated or reported on a subframe ni by the second communication node; in response to a time-domain difference between a control channel subframe n and the subframe ni being less than a time-domain threshold, the first communication node determines that the precoding matrix used on the control channel is a precoding matrix corresponding to the PMI estimated or reported on the subframe ni; and in response to the time-domain difference between the control channel subframe n and the subframe ni being greater than the time-domain threshold, the first communication node uses a predefined precoding matrix on the control channel; where the PMI estimated or reported on the subframe ni is a latest available PMI in the control channel subframe n, and n is greater than ni.

In an embodiment, the method includes steps described below, the first communication node receives the PMI estimated or reported on a subframe ni by the second communication node; in response to a time-domain difference between a minimum control channel subframe n in a subframe set and the subframe ni being less than a time-domain threshold, the first communication node determines that the precoding matrix used on the control channel is a precoding matrix corresponding to the PMI estimated or reported on the subframe ni, where the control channel is a control channel corresponding to all control channel subframes in the subframe set; and in response to the time-domain difference between the minimum control channel subframe n in the subframe set and the subframe ni being greater than the time-domain threshold, the first communication node uses a predefined precoding matrix on the control channel, where the control channel is the control channel corresponding to all control channel subframes in the subframe set; the PMI estimated or reported on the subframe ni is a latest available PMI in the control channel subframe n, and n is greater than ni.

In an embodiment, the time-domain threshold is selected by the first communication node from a time-domain threshold set, the time-domain threshold set is predetermined by the first communication node, and the time-domain threshold set includes at least one threshold value.

In an embodiment, the time-domain threshold is indicated through higher-layer configuration signaling.

In an embodiment, the method further includes steps described below, the first communication node determines a repetition number threshold; in response to the first communication node determining that the number of repetitions of the control channel is less than or equal to the repetition number threshold, the first communication node determines that a precoding matrix used on all repetition subframes of the control channel is a precoding matrix corresponding to a latest PMI sent by the second communication node; and in response to the first communication node determining that the number of repetitions of the control channel is greater than the repetition number threshold, the first communication node uses a predefined precoding matrix on all repetition subframes of the control channel.

In an embodiment, the repetition number threshold is selected by the first communication node from a repetition number threshold set, the repetition number threshold set is predetermined by the first communication node, and the repetition number threshold set includes at least one threshold value.

In an embodiment, the method further includes a step described below, the first communication node determines the repetition number threshold set according to a maximum repetition number of the control channel.

In an embodiment, the method further includes a step described below, the repetition number threshold is indicated through higher-layer configuration signaling.

In an embodiment, the first communication node determines repetition number thresholds corresponding to different control channels according to maximum repetition numbers of the different control channels.

In an embodiment, the method further includes steps described below, the first communication node determines an aggregation level set; in response to the aggregation level of the control channel not belonging to the aggregation level set, the first communication node determines that the precoding matrix used on the control channel is a precoding matrix corresponding to a latest PMI sent by the second communication node; and in response to the aggregation level of the control channel belonging to the aggregation level set, the first communication node uses a predefined precoding matrix on the control channel.

In an embodiment, the aggregation level set is selected by the first communication node from multiple aggregation level sets, and the multiple aggregation level sets are predetermined by the first communication node.

In an embodiment, the aggregation level set is indicated through higher-layer configuration signaling.

In an embodiment, the multiple aggregation level sets are determined by the first communication node according to a configuration of the PRB set of the control channel.

In an embodiment, the method further includes steps described below, in response to the first communication node determining to use a control channel candidate resource A to perform data transmission, the first communication node determines that the precoding matrix used on the control channel is a precoding matrix corresponding to a latest PMI sent by the second communication node; and in response to the first communication node determining to use a control channel candidate resource B to perform the data transmission, the first communication node uses a predefined precoding matrix on the control channel; where the control channel candidate resource A and the control channel candidate resource B respectively correspond to two groups of control channel units.

In an embodiment, the method further includes steps described below, in response to the starting PRB sequence number of the control channel being a minimum PRB sequence number in the PRB set of the control channel, the first communication node determines that the precoding matrix used on the control channel is a precoding matrix corresponding to a latest PMI sent by the second communication node; and in response to the starting PRB sequence number of the control channel not being the minimum PRB sequence number in the PRB set of the control channel, the first communication node uses a predefined precoding matrix on the control channel.

In an embodiment, the method further includes steps described below, the first communication node determines a control channel repetition resource group set C and a control channel repetition resource group set D; in response to the control channel transmitting data within a control channel repetition resource group in the control channel repetition resource group set C, the first communication node determines that the precoding matrix used on the control channel is a precoding matrix corresponding to a latest PMI sent by the second communication node; and in response to the control channel transmitting data within a control channel repetition resource group in the control channel repetition resource group set D, the first communication node uses a predefined precoding matrix on the control channel; where the control channel repetition resource group represents subframes whose number is a maximum repetition number and which correspond to a data block of the control channel, and the control channel repetition resource group set C and the control channel repetition resource group set D respectively contain multiple control channel repetition resource groups.

In an embodiment, the control channel repetition resource group set C and the control channel repetition resource group set D are predetermined by the first communication node and the second communication node, or the control channel repetition resource group set C and the control channel repetition resource group set D are indicated through higher-layer configuration signaling.

In an embodiment, in response to determining to use a PRB set E of the control channel to perform data transmission, the first communication node determines that the precoding matrix used on the control channel is a precoding matrix corresponding to a latest PMI sent by the second communication node; and in response to determining to use a PRB set F of the control channel to perform the data transmission, the first communication node uses a predefined precoding matrix on the control channel.

In an embodiment, the predefined precoding matrix includes a fixed precoding matrix or a precoding matrix varying at least according to time and frequency.

According to another embodiment of the present disclosure, a method for detecting data is provided. The method includes steps described below, a second communication node sends a PMI to a first communication node; the second communication node determines a precoding matrix used on a control channel according to the PMI and a precoding parameter; and the second communication node detects data of the control channel according to the precoding matrix; the precoding parameter includes at least one of: a PMI delay, the number of repetitions of the control channel, an aggregation level of the control channel, a candidate resource of the control channel, a starting PRB sequence number of the control channel, a repetition resource group of the control channel, or a PRB set of the control channel.

In an embodiment, the method further includes steps described below, the second communication node determines a time-domain threshold; the second communication node estimates or reports the PMI on a subframe ni; in response to a time-domain difference between a minimum control channel subframe n in a subframe set and the subframe ni being less than the time-domain threshold, the second communication node determines that the precoding matrix used on the control channel is a precoding matrix corresponding to the PMI estimated or reported on the subframe ni, where the control channel is a control channel corresponding to all control channel subframes in the subframe set; and in response to the time-domain difference between the minimum control channel subframe n in the subframe set and the subframe ni being greater than the time-domain threshold, the second communication node uses a predefined precoding matrix on the control channel, where the control channel is the control channel corresponding to all control channel subframes in the subframe set; where the PMI estimated or reported on the subframe ni is a latest available PMI in the control channel subframe n, and n is greater than ni.

In an embodiment, the method further includes steps described below, the second communication node determines a repetition number threshold; in response to the second communication node detecting the control channel with a control channel repetition number less than or equal to the repetition number threshold, the second communication node detects the data of the control channel on all repetition subframes of the control channel based on a precoding matrix corresponding to the PMI; and in response to the second communication node detecting the control channel with the control channel repetition number greater than the repetition number threshold, the second communication node detects the data of the control channel on all repetition subframes of the control channel based on a predefined precoding matrix.

In an embodiment, the method further includes steps described below, the second communication node determines an aggregation level set; in response to the second communication node detecting the control channel at the aggregation level of the control channel not belonging to the aggregation level set, the second communication node detects the data of the control channel based on the precoding matrix corresponding to the PMI; and in response to the second communication node detecting the control channel at the aggregation level of the control channel belonging to the aggregation level set, the second communication node detects the data of the control channel based on a predefined precoding matrix.

In an embodiment, the method further includes steps described below, in response to the second communication node detecting the control channel on a control channel candidate resource A, the second communication node detects the data of the control channel based on a precoding matrix corresponding to the PMI; and in response to the second communication node detecting the control channel on a control channel candidate resource B, the second communication node detects the data of the control channel based on a predefined precoding matrix; the control channel candidate resource A and the control channel candidate resource B respectively correspond to two groups of control channel units.

In an embodiment, the method further includes steps described below, in response to the starting PRB sequence number of the control channel being a minimum PRB sequence number in the PRB set of the control channel, the second communication node determines that the precoding matrix used on the control channel is a precoding matrix corresponding to a latest PMI sent by the second communication node; and in response to the starting PRB sequence number of the control channel not being the minimum PRB sequence number in the PRB set of the control channel, the second communication node uses a predefined precoding matrix on the control channel.

In an embodiment, the method further includes steps described below, the second communication node determines a control channel repetition resource group set C and a control channel repetition resource group set D; in response to the second communication node detecting the data of the control channel in the control channel repetition resource group set C, the second communication node determines that the precoding matrix used on the control channel is a precoding matrix corresponding to a latest PMI sent by the second communication node; and in response to the second communication node detecting the data of the control channel in the control channel repetition resource group set D, the second communication node determines that the precoding matrix used on the control channel is a predefined precoding matrix. The control channel repetition resource group represents subframes whose number is a maximum repetition number and which correspond to a data block of the control channel, and the control channel repetition resource group set C and the control channel repetition resource group set D respectively contain multiple control channel repetition resource groups.

In an embodiment, the method further includes steps described below, in response to the second communication node detecting the control channel on a PRB set E of the control channel, the second communication node detects the data of the control channel based on a precoding matrix corresponding to the PMI; and in response to the second communication node detecting the control channel on a PRB set F of the control channel, the second communication node detects the data of the control channel based on a predefined precoding matrix.

According to another embodiment of the present disclosure, a method for determining precoding is provided. The method includes the steps described below.

A precoding codebook set is determined.

A precoding codebook of a physical channel is determined based on the precoding codebook set according to at least one of: a radio network temporary identity (RNTI), a cell identity (ID), a DMRS port, a PRB index, a subframe index, or the number of repetitions of the physical channel, where the precoding codebook of the physical channel is a codebook in the precoding codebook set.

In an embodiment, the method includes steps described below.

A starting precoding codebook used by the physical channel is determined, and codebooks in the precoding codebook set are recycled based on the starting precoding codebook.

In an embodiment, the method includes a step described below.

The starting precoding codebook used by the physical channel is determined according to an RNTI value $N_{RNTI}$, where a sequence number of the starting precoding codebook is $(N_{RNTI}+S) \mod N$, N is the number of codebooks contained in the precoding codebook set, and S is an integer greater than or equal to 0.

In an embodiment, the method includes a step described below.

In response to the number of ports of a CRS being 4, the precoding codebook set contains four codebooks.

In an embodiment, the method further includes a step described below.

An angular difference of vector directions of each two of the four codebooks contained in the precoding codebook set is pi/2 or pi.

In an embodiment, the method includes a step described below.

In response to the number of ports of a CRS being 2, the precoding codebook set contains two codebooks, and an angular difference of vector directions of the two codebooks is pi.

In an embodiment, the method further includes a step described below.

For a distributed control channel, in response to the number of ports of a CRS being 2, the distributed control channel uses a fixed precoding matrix.

In an embodiment, the method includes a step described below.

A frequency-domain update granularity of the precoding codebook is determined according to the number of repetitions of the physical channel.

In an embodiment, the method further includes a step described below.

The frequency-domain update granularity of the precoding codebook is indicated through higher-layer configuration signaling.

According to another embodiment of the present disclosure, a device for determining precoding is provided. The device includes a reception module and a first determination module, the reception module is configured to receive a PMI sent by a second communication node; and the first determination module is configured to determine a precoding matrix used on a control channel according to the PMI and a precoding parameter; where the precoding parameter includes at least one of: a PMI delay, the number of repetitions of the control channel, an aggregation level of the control channel, a candidate resource of the control channel, a starting PRB sequence number of the control channel, a repetition resource group of the control channel, or a PRB set of the control channel.

According to another embodiment of the present disclosure, a device for detecting data is provided. The device includes a sending module, a second determination module, and a detection module, the sending module is configured to send a PMI to a first communication node; the second determination module is configured to determine a precoding matrix used on a control channel according to the PMI and a precoding parameter; and the detection module is configured to detect data of the control channel according to the precoding matrix; where the precoding parameter includes at least one of: a PMI delay, the number of repetitions of the control channel, an aggregation level of the control channel, a candidate resource of the control channel, a starting PRB sequence number of the control channel, a repetition resource group of the control channel, or a PRB set of the control channel.

According to another embodiment of the present disclosure, a device for determining precoding is provided. The device includes a third determination module and a fourth determination module.

The third determination module is configured to determine a precoding codebook set.

The fourth determination module is configured to determine, based on the precoding codebook set, a precoding codebook of a physical channel according to at least one of: an RNTI, a cell ID, a DMRS port, a PRB index, a subframe index, or the number of repetitions of the physical channel, where the precoding codebook of the physical channel is a codebook in the precoding codebook set.

According to another embodiment of the present application, a storage medium is further provided. The storage medium is configured to store a computer program which, when executed, is configured to perform the steps in any one of the method embodiments described above.

According to another embodiment of the present disclosure, an electronic device is further provided. The electronic device includes a memory and a processor, where the memory is configured to store a computer program, and the processor is configured to execute the computer program to perform the steps in any one of the method embodiments described above.

In the present application, through the precoding parameter and the PMI fed back by the receiving end, the problem in the related art that when the receiving end adopts the CRS and DMRS joint channel estimation, it is difficult for the receiving end to determine the precoding matrix can be solved, and the receiving end can perform the CRS and DMRS joint channel estimation on the control channel in the PMI feedback state, thereby improving the performance of the MPDCCH.

DETAILED DESCRIPTION

Hereinafter, the present application will be described in detail with reference to drawings and in conjunction with embodiments. It is to be noted that if not in collision, the embodiments and features therein in the present application may be combined with each other.

It is to be noted that the terms such as "first" and "second" in the description, claims and drawings of the present application are used to distinguish between similar objects and are not necessarily used to describe a particular order or sequence.

Embodiment One

Figure 1:
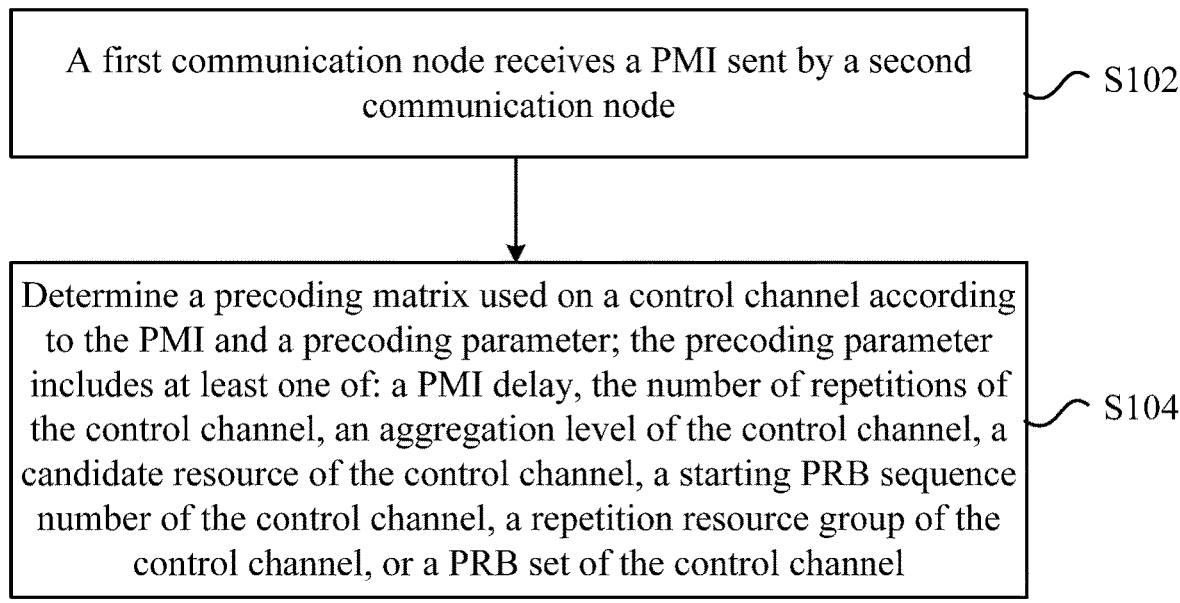
FIG. 1 is a flowchart one of a method for determining precoding according to an embodiment of the present disclosure.

This embodiment provides a method for determining precoding. FIG. 1 is a flowchart one of a method for determining precoding according to an embodiment of the present disclosure. As shown in FIG. 1, the method includes the steps described below.

In step S102, a first communication node receives a PMI sent by a second communication node.

In step S104, a precoding matrix used on a control channel is determined according to the PMI and a precoding parameter; the precoding parameter includes at least one of: a PMI delay, the number of repetitions of the control channel, an aggregation level of the control channel, a candidate resource of the control channel, a starting PRB sequence number of the control channel, a repetition resource group of the control channel, or a PRB set of the control channel.

It is to be noted that the control channel used in this embodiment includes, but is not limited to, an MTC-physical downlink control channel. Other physical channels that can implement the solution described in this embodiment are also within the scope of this embodiment. The details are not repeated here.

Application scenarios of the method for determining precoding described in this embodiment include, but are not limited to, the determination of a precoding matrix of a physical channel when an enhanced MTC (eMTC) network coexists with a long term evolution (LTE) network; the determination of a precoding matrix of a physical channel when an eMTC network coexists with a new radio (NR) network; and the determination of a precoding matrix of a physical channel when an LTE network coexists with an NR network.

It is to be noted that in this embodiment, the first communication node is a transmitting end device, and the second communication node is a receiving end device.

In an embodiment, the method includes steps described below, the first communication node receives the PMI estimated or reported on a subframe $n_i$ by the second communication node; when a time-domain difference between a control channel subframe n and the subframe $n_i$ is less than a time-domain threshold, the first communication node determines that the precoding matrix used on the control channel is a precoding matrix corresponding to the PMI estimated or reported on the subframe $n_i$; when the time-domain difference between the control channel subframe n and the subframe $n_i$ is greater than the time-domain threshold, the first communication node uses a predefined precoding matrix on the control channel. The PMI estimated or reported on the subframe $n_i$ is a latest available PMI in the control channel subframe n, and n is greater than $n_i$.

In an embodiment, the method further includes steps described below, the first communication node receives the PMI estimated or reported on a subframe $n_i$ by the second communication node; when a time-domain difference between a minimum control channel subframe n in a subframe set and the subframe $n_i$ is less than a time-domain threshold, the first communication node determines that the precoding matrix used on the control channel corresponding to all control channel subframes in a subframe set where the control channel subframe n is located is a precoding matrix corresponding to the PMI estimated or reported on the subframe $n_i$; when the time-domain difference between the minimum control channel subframe n in the subframe set and the subframe $n_i$ is greater than the time-domain threshold, the first communication node uses a predefined precoding matrix on the control channel corresponding to all control channel subframes in the subframe set where the control channel frame n is located. The PMI estimated or reported on the subframe $n_i$ is a latest available PMI in the control channel subframe n, and n is greater than $n_i$.

In an embodiment, the PMI estimated or reported on the subframe $n_i$ is the latest available PMI in the control channel subframe n, that is, the last PMI received by the first communication node as of the moment at which the first communication node performs the determination operation.

It is to be noted that the above-mentioned subframe set refers to that in the case where the second communication node can implement the cross-subframe joint channel estimation, the first communication node is required to use the same precoding matrix on every X consecutive subframes, and these X link subframes constitute the subframe set.

In an embodiment, the time-domain threshold is selected by the first communication node from a time-domain threshold set, the time-domain threshold set is predetermined by the first communication node, and the time-domain threshold set includes at least one threshold value.

In an embodiment, the time-domain threshold is indicated through higher-layer configuration signaling.

In an embodiment, the method further includes steps described below, the first communication node determines a repetition number threshold; when the first communication node determines that the number of repetitions of the control channel is less than or equal to the repetition number threshold, the first communication node determines that a precoding matrix used on all repetition subframes of the control channel is a precoding matrix corresponding to a latest PMI sent by the second communication node; and when the first communication node determines that the number of repetitions of the control channel is greater than the repetition number threshold, the first communication node uses a predefined precoding matrix on all repetition subframes of the control channel.

In an embodiment, the repetition number threshold is selected by the first communication node from a repetition number threshold set, the repetition number threshold set is predetermined by the first communication node, and the repetition number threshold set includes at least one threshold value.

In an embodiment, the first communication node determines the repetition number threshold set according to a maximum repetition number of the control channel.

In an embodiment, in a case where the maximum repetition number of the control channel is less than 8, the repetition number threshold set may contain only one threshold value, and the threshold value is equal to the maximum repetition number of the control channel.

In an embodiment, in a case where the maximum repetition number of the control channel is greater than or equal to 8, the threshold set includes, but is not limited to, $p/2^q$ times the maximum number of repetitions of the control channel, where p and q both are positive integers, and p is less than or equal to $2^q$. For example, the repetition number threshold set includes one-fourth of the maximum number of repetitions of the control channel, half of the maximum number of repetitions of the control channel, three-fourths of the maximum number of repetitions of the control channel, and the maximum number of repetitions of the control channel.

In an embodiment, the method further includes steps described below, the first communication node determines the repetition number threshold set according to the maximum repetition number of the control channel. For example, if the maximum repetition number $R_{max}$ of the control channel is equal to 32, the first communication node sets the repetition number threshold set to $\{R_{max}/4, R_{max}/2, R_{max}\cdot3/4, R_{max}\}$, that is, $\{8, 16, 24, 32\}$.

In an embodiment, the method further includes indicating the repetition number threshold through higher-layer configuration signaling.

In an embodiment, the first communication node determines repetition number thresholds corresponding to different control channels according to maximum repetition numbers of the different control channels.

In an embodiment, the method further includes steps described below, the first communication node determines an aggregation level set; when the aggregation level of the control channel does not belong to the aggregation level set, the first communication node determines that the precoding matrix used on the control channel is a precoding matrix corresponding to a latest PMI sent by the second communication node; and when the aggregation level of the control channel belongs to the aggregation level set, the first communication node uses a predefined precoding matrix on the control channel.

In an embodiment, the latest PMI sent by the second communication set represents a PMI which is latest received by the first communication node and fed back by the second communication node. Therefore, the step in which the first communication node determines that the precoding matrix used on the control channel is the precoding matrix corresponding to the latest PMI sent by the second communication node may also be expressed as that the transmitting end determines to use on the control channel the precoding matrix corresponding to the PMI which is latest received by the transmitting end and fed back by the receiving end.

In an embodiment, the aggregation level set is selected by the first communication node from multiple aggregation level sets, and the multiple aggregation level sets are predetermined by the first communication node.

In an embodiment, the aggregation level set is indicated through higher-layer configuration signaling.

In an embodiment, the aggregation level set is determined by the first communication node according to a configuration of the PRB set of the control channel.

In an embodiment, corresponding aggregation level sets are determined according to configurations of different control channel physical resource block sets. Each configuration of the control channel physical resource block set corresponds to one aggregation level set. The second communication node may determine the aggregation level set used by the control channel according to the control channel physical resource block set.

In an embodiment, the control channel physical resource block set is a PRB set monitored by the second communication node for obtaining control channel information. When the control channel is the MPDCCH, the control channel physical resource block set is an MPDCCH-PRB-set.

In an embodiment, when the first communication node determines to use a control channel candidate resource A to perform data transmission, the first communication node determines that the precoding matrix used on the control channel is a precoding matrix corresponding to a latest PMI sent by the second communication node; and when the first communication node determines to use a control channel candidate resource B to perform the data transmission, the first communication node uses a predefined precoding matrix on the control channel. The control channel candidate resource A and the control channel candidate resource B respectively correspond to two groups of control channel units.

In an embodiment, the control channel candidate resource A and the control channel candidate resource B are two different control channel candidate resources. If A=0, B=1; if B=0, A=1. When the control channel is the MPDCCH, the control channel candidate resource is an MPDCCH candidate.

In an embodiment, the method further includes steps described below, when the starting PRB sequence number of the control channel is a minimum PRB sequence number in the PRB set of the control channel, the first communication node determines that the precoding matrix used on the control channel is a precoding matrix corresponding to a latest PMI sent by the second communication node; otherwise, the first communication node uses a predefined precoding matrix on the control channel.

In an embodiment, the method further includes steps described below, the first communication node determines a control channel repetition resource group set C and a control channel repetition resource group set D; when the control channel transmits data within a control channel repetition resource group in the control channel repetition resource group set C, the first communication node determines that the precoding matrix used on the control channel is a precoding matrix corresponding to a latest PMI sent by the second communication node; and when the control channel transmits data within a control channel repetition resource group in the control channel repetition resource group set D, the first communication node uses a predefined precoding matrix on the control channel. The control channel repetition resource group represents subframes whose number is a maximum repetition number and which correspond to a data block of the control channel, and the control channel repetition resource group set contains multiple control channel repetition resource groups.

In an embodiment, $0^{th}$ to $(N-1)^{th}$ data blocks of the control channel correspond to $0^{th}$ to $(N-1)^{th}$ control channel repetition resource groups, respectively. The first communication node determines the control channel repetition resource group sets C and D from $0^{th}$ to $(N-1)^{th}$ control channel repetition resource groups. For example, the control channel repetition resource group set C is determined to include $n^{th}$ control channel repetition resource group, where n=0, 1, 2, 3, . . . , and N-1, and n satisfies n mod 3=2, and the remaining control channel repetition resource groups are the control channel repetition resource group set D.

In an embodiment, the control channel repetition resource group set is predetermined by the first communication node and the second communication node, and the control channel repetition resource group set has been known to the second communication node and thus does not need to be notified through signaling; alternatively, the control channel repetition resource group set contains multiple set configurations, and the configuration of one of the multiple sets is indicated through higher-layer configuration signaling.

In an embodiment, when it is determined to use a PRB set E of the control channel to perform data transmission, the first communication node determines that the precoding matrix used on the control channel is a precoding matrix corresponding to a latest PMI sent by the second communication node; when it is determined to use a PRB set F of the control channel to perform the data transmission, the first communication node uses a predefined precoding matrix on the control channel.

In an embodiment, the PRB set E of the control channel and the PRB set F of the control channel are two different PRB sets of the control channel. If F=0, E=1; if F=0, E=1. When the control channel is the MPDCCH, the PRB set of the control channel is the MPDCCH-PRB-set.

In an embodiment, when the first communication node determines to use the PRB set E of the control channel to perform the data transmission, it may be indicated through higher-layer configuration signaling whether the precoding matrix used on the control channel on the PRB set E of the control channel is the precoding matrix corresponding to the latest PMI sent by the second communication node, or the predefined precoding matrix.

In an embodiment, when the first communication node determines to use the PRB set F of the control channel to perform the data transmission, it may also be indicated through higher-layer configuration signaling whether the precoding matrix used on the control channel on the PRB set F of the control channel is the precoding matrix corresponding to the latest PMI sent by the second communication node or the predefined precoding matrix.

In an embodiment, the predefined precoding matrix includes a fixed precoding matrix or a precoding matrix varying at least according to time and frequency. The fixed precoding matrix includes: for the localized transmission control channel, one fixed precoding matrix is used in time domain and frequency domain, where the precoding matrix does not vary with time and frequency; for the distributed transmission control channel, two fixed precoding matrix are used in time domain and frequency domain.

In order to better understand the solutions described above, this embodiment further provides the following scenarios.

Scenario One

The scenario one is applied to the localized MPDCCH. After receiving a PMI fed back by the second communication node, the first communication node determines a precoding matrix of the MPDCCH according to the PMI delay and the PMI fed back by the second communication node.

In step 1, a time-domain threshold is determined.

The value of the time-domain threshold is equal to N, and N is an integer greater than 1. The time-domain threshold may be expressed as N subframes, or may be expressed as N milliseconds.

In this embodiment, the time-domain threshold may be determined in two manners described below.

In manner one, multiple time-domain thresholds known to the first communication node and the second communication node are configured, and these time-domain thresholds constitute a time-domain threshold set. For example, four time-domain thresholds {16, 32, 64, 128} are configured as the time-domain threshold set. The first communication node selects one from the four time-domain thresholds as the time-domain threshold, for example, 16, and 16 is indicated through higher-layer configuration signaling. After receiving the higher-layer configuration signaling, the second communication node may determine the time-domain threshold as the time-domain threshold 16.

In manner two, one fixed time-domain threshold is configured, and this time-domain threshold is known to the first communication node and the second communication node, which does not need to be notified through signaling.

In step 2, based on the time-domain threshold, the first communication node determines the precoding matrix of the MPDCCH according to the PMI delay and the PMI fed back by the second communication node.

In an embodiment, the PMI delay is represented in two manners described below.

In manner one, assuming that the PMI estimated on the subframe n1 is the latest available PMI on the subframe n, (n−n1) is the PMI delay.

In manner two, assuming that the PMI reported on the subframe n1 is the latest available PMI on the subframe n, (n−n1) is the PMI delay.

The step of determining the precoding matrix used by the MPDCCH subframe n includes: when (n−n1) is less than the time-domain threshold, the subframe n uses the precoding matrix corresponding to the PMI estimated or reported on the subframe n1; when (n−n1) is greater than the time-domain threshold, the subframe n uses the predefined precoding matrix.

In an embodiment, the involved subframe sequence numbers, for example, the subframe n and subframe n1, are absolute subframe numbers.

Meanwhile, when the cross-subframe joint channel estimation is implemented, the first communication node needs to use the same precoding matrix on every X consecutive subframes, where X is greater than or equal to 1, so the precoding matrix cannot be switched within the subframe set constituted by every X subframes. Therefore, the precoding matrix used by the MPDCCH may be determined based on the minimum MPDCCH subframe in the subframe set. In an embodiment, assuming that the sequence number of the minimum MPDCCH subframe in the subframe set is n, when (n−n1) is less than the time-domain threshold, all MPDCCH subframes in the subframe set where the subframe n is located use the precoding matrix corresponding to the PMI estimated or reported on the subframe n1; when (n−n1) is greater than the time-domain threshold, all MPDCCH subframes in the subframe set where the subframe n is located use the predefined precoding matrix. In this manner, it can at least ensure that MPDCCH subframes within the subframe set have the same precoding matrix.

In an embodiment, the PMI estimated or reported on the subframe n1 is the latest available PMI in the control channel subframe n.

Scenario Two

The scenario two is applied to the localized MPDCCH. When the PMI feedback is enabled, after receiving a PMI fed back by the second communication node, the first communication node determines a precoding matrix of the MPDCCH according to the number of repetitions of the MPDCCH and the PMI fed back by the second communication node, which is described below.

In step 1, a repetition number threshold is determined.

In an embodiment, the repetition number threshold may be determined in two manners described below.

In manner one, when the maximum number of repetitions of the MPDCCH is greater than or equal to 8, a repetition number threshold set is determined, where the repetition number threshold set includes: one-fourth of the maximum number of repetitions of the control channel, half of the maximum number of repetitions of the control channel, three-fourths of the maximum number of repetitions of the control channel, and the maximum number of repetitions of the control channel. For example, when the maximum number of repetitions is 64, there is a case where the repetition number threshold set includes {16, 32, 48, 64}. The first communication node selects 16 from this threshold set as the repetition number threshold, and the second communication node is notified of this threshold value through higher-layer configuration signaling. The second communication node receives the higher-layer configuration signaling and may acquire the repetition number threshold as 16.

It is to be noted that when the maximum number of repetitions of the MPDCCH is less than or equal to 4, the repetition number threshold is the maximum number of repetitions of the MPDCCH.

In manner two, the repetition number threshold does not need to be configured. The corresponding repetition number threshold values are directly determined according to the maximum numbers of repetitions of different MPDCCHs. Each configuration of the maximum number of repetitions of the MPDCCH corresponds to one repetition number threshold value. The second communication node may directly determine the repetition number threshold value used by the control channel according to the maximum number of repetitions of the control channel. For manner two, there is an example below. When the maximum number of repetitions of the MPDCCH is less than or equal to 8, the repetition number threshold value is the maximum number of repetitions of the MPDCCH; when the maximum number of repetitions of the MPDCCH is equal to 16, the repetition number threshold value is 12; and when the maximum number of repetitions of the MPDCCH is equal to 32 or 64, the repetition number threshold value is 16.

In step 2, based on the repetition number threshold, the first communication node determines the precoding matrix of the MPDCCH according to the number of repetitions of the MPDCCH and the PMI fed back by the second communication node.

In an embodiment, when the number of repetitions of the MPDCCH configured by the first communication node is less than or equal to the repetition number threshold, all repetition subframes of the MPDCCH use the precoding matrix corresponding to the latest PMI fed back by the second communication node; and when the number of repetitions of the MPDCCH configured by the first communication node is greater than the repetition number threshold, all repetition subframes of the MPDCCH use the predefined precoding matrix.

For example, when the maximum number of repetitions of the MPDCCH is 64, and the repetition number threshold is determined to be 16, if the first communication node configures the number of repetitions of the MPDCCH as 48, all 48 MPDCCH subframes within a repetition period use the predefined precoding matrix; if the first communication node configures the number of repetitions of the MPDCCH as 16, all 16 MPDCCH subframes within the repetition period use the precoding matrix corresponding to the latest PMI fed back by the second communication node.

In an embodiment, the latest PMI fed back by the second communication node represents the latest PMI available to the first communication node.

Scenario Three

The scenario three is applied to the localized MPDCCH. After receiving a PMI fed back by the second communication node, the first communication node determines a precoding matrix of the MPDCCH according to an aggregation level of the MPDCCH and the PMI fed back by the second communication node.

In step 1, an aggregation level set is determined.

In an embodiment, the aggregation level represents the number of enhanced control channel elements (ECCEs) occupied by the MPDCCH data transmission; and the aggregation level set contains one or more aggregation levels.

In an embodiment, the aggregation level set may be determined in three manners described below.

In manner one, multiple aggregation level sets are determined, one of the multiple aggregation level sets is selected, and the selected aggregation level set is notified through higher-layer configuration signaling. The higher-layer configuration signaling is sent to the second communication node. Therefore, the second communication node receives the higher-layer configuration signaling and may determine the aggregation level set used by the MPDCCH.

For example, four aggregation level sets are determined, which are {2 ECCEs, 8 ECCEs}, {2 ECCEs, 16 ECCEs}, {4 ECCEs, 8 ECCEs}, and {4 ECCEs, 16 ECCEs}, respectively. The second communication node is notified of which one of these aggregation level sets is used by the MPDCCH through one piece of higher-layer configuration signaling.

In manner two, corresponding aggregation level sets are determined according to configurations of different MPDCCH-PRB-sets. Each configuration of the MPDCCH-PRB-set corresponds to one aggregation level set. The second communication node may determine the aggregation level set used by the MPDCCH according to the configuration of the MPDCCH-PRB-set.

For example, for the configuration of an MPDCCH-PRB-set containing 2 PRBs, the aggregation level set is {4 ECCEs}; for the configuration of an MPDCCH-PRB-set containing 4 PRBs, the aggregation level set is {2 ECCEs, 8 ECCEs}; for the configuration of an MPDCCH-PRB-set containing 2 PRBs and an MPDCCH-PRB-set containing 4 PRBs, the aggregation level set is {2 ECCEs, 8 ECCEs}; for the configuration of an MPDCCH-PRB-set containing 6 PRBs, there is only one aggregation level of 24 ECCEs, so the MPDCCH-PRB-set containing 6 PRBs does not need to be configured with the aggregation level set.

In manner three, one fixed aggregation level set is configured, and this aggregation level set is known to the first communication node and the second communication node, which does not need to be notified through signaling.

In step 2, based on the aggregation level set, the first communication node determines the precoding matrix of the MPDCCH according to the aggregation level of the MPDCCH and the PMI fed back by the second communication node.

In an embodiment, when the aggregation level of the MPDCCH does not belong to the aggregation level set, the MPDCCH uses the precoding matrix corresponding to the latest PMI fed back by the second communication node; and when the aggregation level of the MPDCCH belongs to the aggregation level set, the MPDCCH uses the predefined precoding matrix.

It is to be noted that this embodiment also contains an inverse precoding matrix determination method, that is, when the aggregation level of the MPDCCH belongs to the aggregation level set, the MPDCCH uses the precoding matrix corresponding to the latest PMI fed back by the second communication node; and when the aggregation level of the MPDCCH does not belong to the aggregation level set, the MPDCCH uses the predefined precoding matrix.

In an embodiment, the latest PMI fed back by the second communication node represents the latest PMI available to the first communication node.

From the description of the preceding embodiments, it will be apparent to those skilled in the art that the method in the preceding embodiments may be implemented by software plus a necessary general-purpose hardware platform or may of course be implemented by hardware. However, in many cases, the former is a preferred implementation. Based on this understanding, the solution of the present application substantially or the part contributing to the existing art may be embodied in the form of a software product. The software product is stored in a storage medium (such as a read-only memory (ROM)/random-access memory (RAM), a magnetic disk or an optical disk) and includes several instructions for enabling a terminal device (which may be a mobile phone, a computer, a server or a network device) to perform the method of each embodiment of the present application.

Embodiment Two

Figure 2:
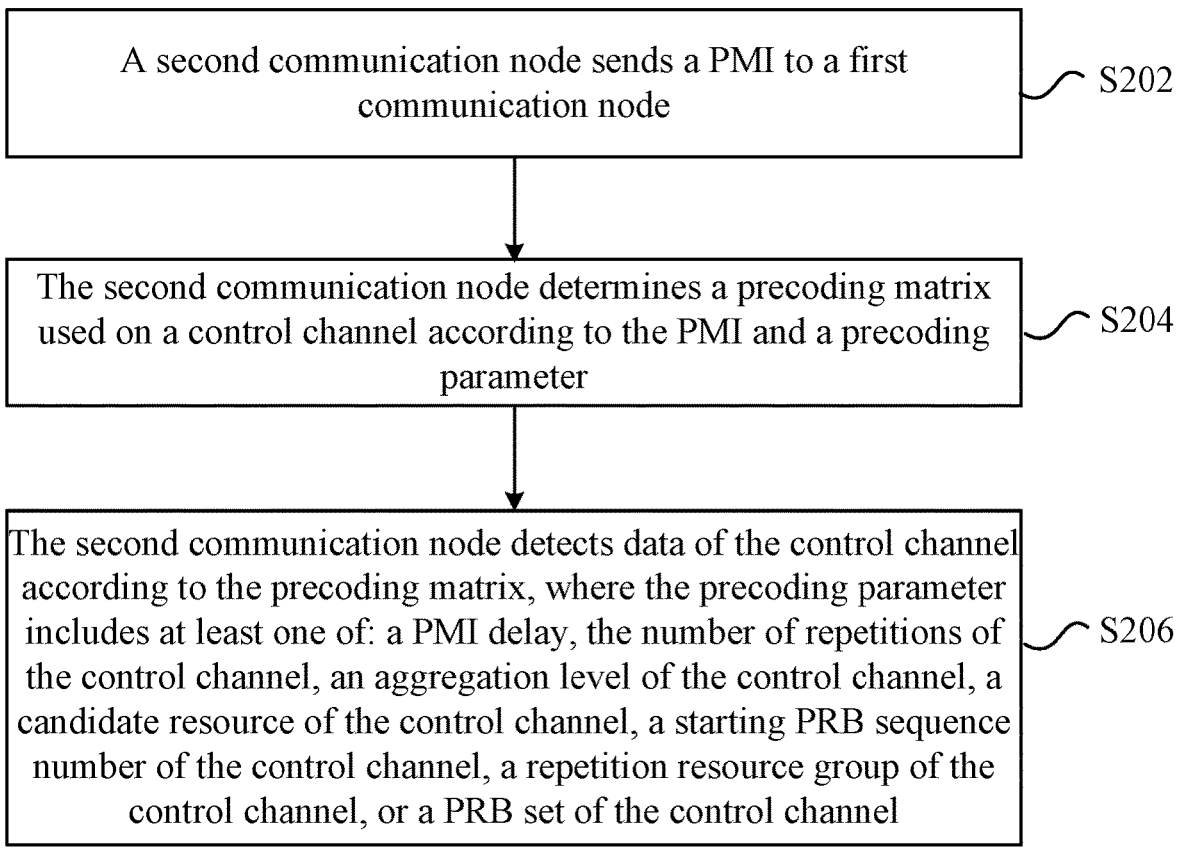
FIG. 2 is a flowchart of a method for detecting data according to an embodiment of the present disclosure.

This embodiment further provides a method for detecting data. FIG. 2 is a flowchart of a method for detecting data according to an embodiment of the present disclosure. What has been described will not be repeated. As shown in FIG. 2, the method includes the steps described below.

In step S202, a second communication node sends a PMI to a first communication node.

In step S204, the second communication node determines a precoding matrix used on a control channel according to the PMI and a precoding parameter.

In step S206, the second communication node detects data of the control channel according to the precoding matrix. The precoding parameter includes at least one of: a PMI delay, the number of repetitions of the control channel, an aggregation level of the control channel, a candidate resource of the control channel, a starting PRB sequence number of the control channel, a repetition resource group of the control channel, or a PRB set of the control channel.

Similarly, the control channel used in this embodiment includes, but is not limited to, an MTC-physical downlink control channel. Other control channels that can implement the solution described in this embodiment are also within the scope of this embodiment. The details are not repeated here.

Similarly, in this embodiment, the first communication node is a transmitting end device, and the second communication node is a receiving end device.

It is to be noted that for the manner of executing the steps in step S204 in embodiment two, reference may be made to the description of the steps in step S104 in embodiment one.

The control channel detection is to detect the data of the control channel, and may represent the detection of downlink control information (DCI) or uplink control information (UCI).

In an embodiment, the second communication node determines a time-domain threshold; the second communication node estimates or reports the PMI on a subframe $n_i$; when a time-domain difference between a minimum control channel subframe n in a subframe set and the subframe $n_i$ is less than the time-domain threshold, the second communication node determines that the precoding matrix used on the control channel corresponding to all control channel subframes in the subframe set where the control channel subframe n is located is a precoding matrix corresponding to the PMI estimated or reported on the subframe $n_i$; and when the time-domain difference between the minimum control channel subframe n in the subframe set and the subframe $n_i$ is greater than the time-domain threshold, the second communication node uses a predefined precoding matrix on the control channel corresponding to all control channel subframes in the subframe set where the control channel subframe n is located. The PMI estimated or reported on the subframe $n_i$ is a latest available PMI in the control channel subframe n, and n is greater than $n_i$.

In an embodiment, the time-domain threshold is indicated through higher-layer configuration threshold, and after receiving the higher-layer configuration threshold, the second communication node may determine the time-domain threshold.

In an embodiment, the second communication node determines a repetition number threshold; the second communication node determines the repetition number threshold; when the second communication node detects the control channel with a control channel repetition number less than or equal to the repetition number threshold, the second communication node determines by default that a precoding matrix used on all repetition subframes of the control channel is a precoding matrix corresponding to a latest PMI sent by the second communication node, that is, the second communication node detects the data of the control channel on all repetition subframes of the control channel based on the precoding matrix corresponding to the PMI; and when the second communication node detects the control channel with the control channel repetition number greater than the repetition number threshold, the second communication node determines by default that the precoding matrix used on all repetition subframes of the control channel is a predefined precoding matrix, that is, the second communication node detects the data of the control channel on all repetition subframes of the control channel based on the predefined precoding matrix.

In an embodiment, the repetition number threshold is indicated to the second communication node through higher-layer configuration signaling.

In an embodiment, the repetition number threshold may also be predetermined according to the maximum number of repetitions of the control channel, and after knowing the maximum number of repetitions of the control channel, the second communication may determine the repetition number threshold.

In an embodiment, the second communication node determines an aggregation level set; when the second communication node detects the control channel at the aggregation level of the control channel not belonging to the aggregation level set, the second communication node determines by default that the precoding matrix used on the control channel is a precoding matrix corresponding to a latest PMI sent by the second communication node, that is, the second communication node detects the data of the control channel based on the precoding matrix corresponding to the PMI; when the second communication node detects the control channel at the aggregation level of the control channel belonging to the aggregation level set, the second communication node determines by default that the precoding matrix used on the control channel is a predefined precoding matrix, that is, the second communication node detects the data of the control channel based on the predefined precoding matrix.

In an embodiment, when the second communication node detects the control channel on a control channel candidate resource A, the second communication node determines by default that the precoding matrix used on the control channel is a precoding matrix corresponding to a latest PMI sent by the second communication node, that is, the second communication node detects the data of the control channel based on the precoding matrix corresponding to the PMI; and when the second communication node detects the control channel on a control channel candidate resource B, the second communication node determines by default that the precoding matrix used on the control channel is a predefined precoding matrix, that is, the second communication node detects the data of the control channel based on the predefined precoding matrix. The control channel candidate resource A and the control channel candidate resource B respectively correspond to two groups of control channel units.

In an embodiment, when the starting PRB sequence number of the control channel is a minimum PRB sequence number in the PRB set of the control channel, the second communication node determines that the precoding matrix used on the control channel is a precoding matrix corresponding to a latest PMI sent by the second communication node; otherwise, the second communication node uses the predefined precoding matrix on the control channel.

In an embodiment, the second communication node determines a control channel repetition resource group set C and a control channel repetition resource group set D; when the second communication node detects the data of the control channel in the control channel repetition resource group set C, the second communication node determines that the precoding matrix used on the control channel is a precoding matrix corresponding to a latest PMI sent by the second communication node; and when the second communication node detects the data of the control channel in the control channel repetition resource group set D, the second communication node determines that the precoding matrix used on the control channel is the predefined precoding matrix. The control channel repetition resource group represents subframes whose number is a maximum repetition number and which correspond to a data block of the control channel, and the control channel repetition resource group set contains multiple control channel repetition resource groups.

In an embodiment, the control channel repetition resource group set is predetermined by the first communication node and the second communication node, and the control channel repetition resource group set has been known to the second communication node and thus does not need to be notified through signaling.

In an embodiment, the control channel repetition resource group set may also be indicated through higher-layer configuration signaling. After receiving the higher-layer configuration signaling, the second communication node may determine the control channel repetition resource group set.

In an embodiment, when the second communication node detects the control channel on a PRB set E of the control channel, the second communication node determines by default that the precoding matrix used on the control channel is a precoding matrix corresponding to a latest PMI sent by the second communication node, that is, the second communication node detects the data of the control channel based on the precoding matrix corresponding to the PMI; and when the second communication node detects the control channel on a PRB set F of the control channel, the second communication node determines by default that the precoding matrix used on the control channel is the predefined precoding matrix, that is, the second communication node detects the data of the control channel based on the predefined precoding matrix.

In an embodiment, for the PRB set E of the control channel, the second communication node detects the data of the control channel based on the precoding matrix corresponding to the PMI; for the PRB set F of the control channel, the second communication node detects the data of the control channel based on the predefined precoding matrix.

In an embodiment, the case where the precoding matrix of the PRB set E of the control channel may also be indicated through the higher-layer configuration signaling includes: the higher-layer configuration signaling is sent to the second communication node, and the higher-layer configuration signaling indicates whether the precoding matrix used on the PRB set E of the control channel is the precoding matrix corresponding to the PMI or the predefined precoding matrix.

In an embodiment, the case where the precoding matrix of the PRB set F of the control channel may also be indicated through the higher-layer configuration signaling includes: the higher-layer configuration signaling is sent to the second communication node, and the higher-layer configuration signaling indicates whether the precoding matrix used on the PRB set F of the control channel is the precoding matrix corresponding to the PMI or the predefined precoding matrix.

In an embodiment, the predefined precoding matrix includes a fixed precoding matrix or a precoding matrix varying at least according to time and frequency. The first communication node and the second communication node have known the principle of the varying precoding matrix and thus can determine the precoding matrix used on the control channel.

Embodiment Three

Figure 3:
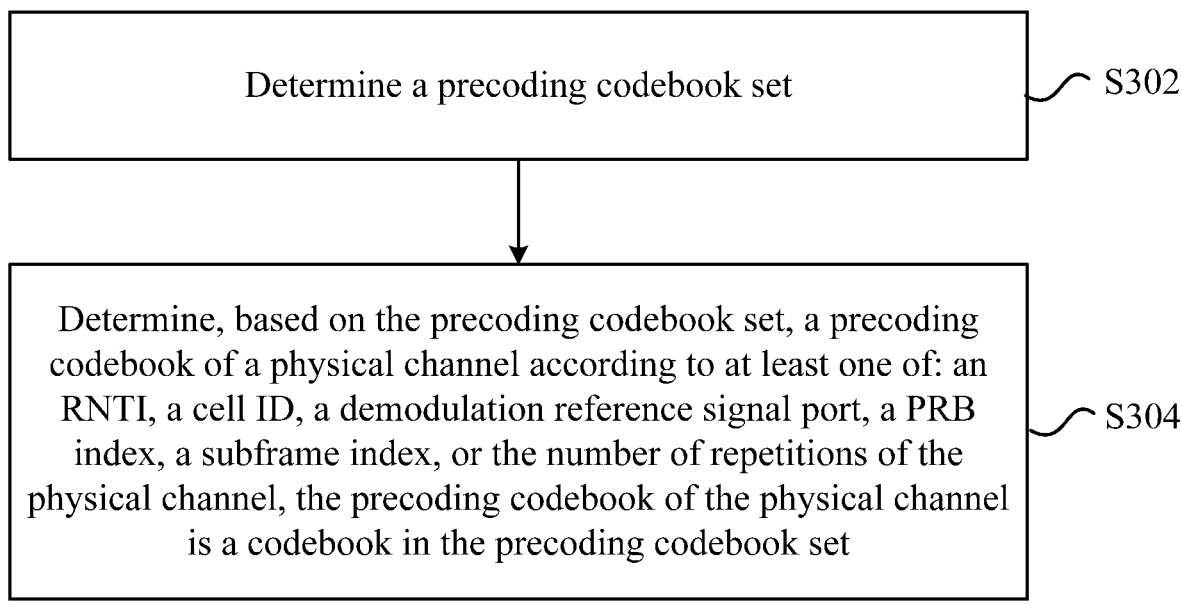
FIG. 3 is a flowchart two of a method for determining precoding according to an embodiment of the present disclosure.

This embodiment provides a method for determining precoding. FIG. 3 is a flowchart two of a method for determining precoding according to an embodiment of the present disclosure. As shown in FIG. 3, the method includes the steps described below.

In step S302, a precoding codebook set is determined.

In step S304, a precoding codebook of a physical channel is determined based on the precoding codebook set according to at least one of: an RNTI, a cell ID, a DMRS port, a PRB index, a subframe index, or the number of repetitions of the physical channel, where the precoding codebook of the physical channel is a codebook in the precoding codebook set.

The method for determining precoding described in this embodiment is not limited to the control channel, and may also be applied to other physical channels, such as a physical downlink shared channel, a physical uplink shared channel, and the like.

Application scenarios of the method for determining precoding described in this embodiment include, but are not limited to, the determination of a precoding matrix of the physical channel when an eMTC network coexists with an LTE network; the determination of a precoding matrix of the physical channel when an eMTC network coexists with an NR network; and the determination of a precoding matrix of the physical channel when an LTE network coexists with an NR network.

The precoding codebook is a precoding matrix.

The PRB index and the subframe index are a PRB sequence number and a subframe sequence number, respectively. The subframe index is the absolute subframe index.

In an embodiment, one precoding codebook set is determined, the precoding codebook set contains N precoding codebooks, and the physical channel recycles the codebooks in the precoding codebook set in sequence.

In an embodiment, a starting precoding codebook used by the physical channel is determined first, and the starting precoding codebook is the codebook in the precoding codebook set. The codebooks in the precoding codebook set are recycled in sequence based on the starting precoding codebook.

In an embodiment, after the starting precoding codebook used by the physical channel is determined, a precoding matrix used on a $k^{th}$ PRB of a $j^{th}$ subframe is determined according to the subframe index j and the PRB index k based on the starting precoding codebook, where j and k are equal to 0, 1, 2, 3, . . . .

In an embodiment, the step in which the starting precoding codebook used by the physical channel is determined includes determining the starting precoding codebook of the physical channel according to an RNTI value $N_{RNTI}$, which includes: if the precoding codebook set contains N codebooks, and sequence numbers of the N precoding codebooks are 0 to (N−1), the sequence number of the starting precoding codebook is $(N_{RNTI}+S)$ mod N. The RNTI includes a cell RNTI (C-RNTI), and S is an integer greater than or equal to 0 and may be determined by other configuration parameters.

In an embodiment, the step in which the starting precoding codebook used by the physical channel is determined further includes determining the starting precoding codebook of the physical channel according to a value $N_{ID}$ of the cell ID, which includes: the sequence number of the starting precoding codebook is $(N_{ID}+S)$ mod N, and S is an integer greater than or equal to 0 and may be determined by other configuration parameters.

In an embodiment, the step in which the starting precoding codebook used by the physical channel is determined further includes determining the starting precoding codebook of the physical channel according to an index $N_{port}$ of the DMRS port, which includes: the sequence number of the starting precoding codebook is $(N_{port}+S)$ mod N, and S is an integer greater than or equal to 0 and may be determined by other configuration parameters.

In an embodiment, when the number of ports of a CRS is 4, that is, when the transmitting end uses four transmit antennas to send the data of the physical channel, the precoding codebook set contains four codebooks.

In an embodiment, the four codebooks include that an angular difference of vector directions of each two of the four codebooks is pi/2 or pi. For example, the four codebooks may be set to $$\frac{1}{2}\begin{bmatrix}1\\1\\1\\1\end{bmatrix}, \frac{1}{2}\begin{bmatrix}1\\i\\-1\\-i\end{bmatrix}, \frac{1}{2}\begin{bmatrix}1\\-1\\1\\-1\end{bmatrix}, \text{ and } \frac{1}{2}\begin{bmatrix}1\\-i\\-1\\i\end{bmatrix},$$

respectively.

In an embodiment, when the number of ports of the CRS is 2, that is, when the transmitting end uses two transmit antennas to send the data of the physical channel, the precoding codebook set contains two codebooks, and the vector directions of the two codebooks are opposite to each other, that is, the angular difference is pi. For example, the two codebooks may be set to $$\frac{1}{\sqrt{2}}\begin{bmatrix}1\\1\end{bmatrix} \text{ and } \frac{1}{\sqrt{2}}\begin{bmatrix}1\\-1\end{bmatrix},$$

respectively, and may also be set to $$\frac{1}{\sqrt{2}}\begin{bmatrix}1\\i\end{bmatrix} \text{ and } \frac{1}{\sqrt{2}}\begin{bmatrix}1\\-1\end{bmatrix},$$

respectively.

In an embodiment, a frequency-domain update granularity of the precoding codebook is determined according to the number of repetitions of the physical channel. The frequency-domain update granularity of the precoding codebook represents that: if the frequency-domain update granularity of the precoding codebook is G PRBs, the physical channel updates the precoding codebook once every G PRBs in frequency domain, where G is a positive integer.

In an embodiment, when the frequency-domain update granularity of the precoding codebook is determined to be G PRBs according to the number of repetitions of the physical channel, the precoding codebook is updated once every G PRBs in frequency domain.

In an embodiment, when the number R of repetitions of the physical channel is greater than or equal to a threshold $R_0$, the frequency-domain update granularity of the precoding codebook is equal to the number of PRBs occupied by the physical channel. That is, within one subframe, all PRBs of the physical channel use the same precoding matrix, that is, the precoding matrix is not updated in frequency domain.

In an embodiment, if the precoding codebook set contains N codebooks and the physical channel updates the precoding codebook every X subframes, the threshold $R_0=N \cdot X$. Then, when the number R of repetitions of the physical channel is greater than or equal to N·X, i.e., R/X≥N, that is, when one data block of the physical channel may traverse all precoding codebooks in the precoding codebook set in time domain, the frequency-domain update granularity of the precoding codebook is equal to the number of PRBs occupied by the physical channel.

The number R of repetitions of the physical channel is equal to one of the maximum number of repetitions of the physical channel, the number of repetitions of the actual transmission of the physical channel, or L times the maximum number of repetitions of the physical channel, where L is greater than 0 and less than 1.

In an embodiment, the frequency-domain update granularity of the precoding codebook may also be indicated through higher-layer configuration signaling. When the higher-layer configuration signaling indicates that the frequency-domain update granularity of the precoding codebook is G PRBs, the precoding matrix is updated once every G PRBs in frequency domain.

Since when the number of repetitions of the physical channel is relatively large, one data block of the physical channel repeatedly transmits a large number of subframes in time domain, the update of the precoding matrix between subframes can enable the data block of the physical channel to traverse the precoding matrixes sufficiently to obtain a sufficient diversity gain, and the precoding matrix does not need to be updated again in frequency domain. Therefore, within one subframe, all PRBs use the same precoding matrix.

When the number of repetitions of the physical channel is equal to 1, that is, the retransmission is not used, the frequency-domain update granularity of the precoding codebook is equal to 1 PRB, that is, within one subframe, each PRB of the physical channel updates the precoding matrix once.

Since one data block of the physical channel may only go through one subframe in time domain when the physical channel is transmitted in a single transmission, the one data block of the physical channel cannot traverse the precoding matrixes in time domain, and thus the precoding matrix needs to be updated in frequency domain so that the data block of the physical channel can traverse as many precoding matrixes as possible to acquire the diversity gain. Therefore, within one subframe, each PRB updates the precoding matrix once.

For a distributed control channel, for example, the distributed MPDCCH, when two transmit antennas are used to send the data of the MPDCCH, that is, the number of ports of the CRS is 2, the distributed control channel uses a fixed precoding matrix and two fixed precoding matrixes in time domain and frequency domain.

Embodiment Four

This embodiment further provides a device for determining precoding. The device is used for implementing the above-mentioned embodiments and exemplary implementations. What has been described will not be repeated. As used below, the term "module" may be software, hardware, or a combination thereof capable of implementing predetermined functions. The device in the embodiment described below is preferably implemented by software, but an implementation by hardware or by a combination of software and hardware is also possible and conceivable.

Figure 4:
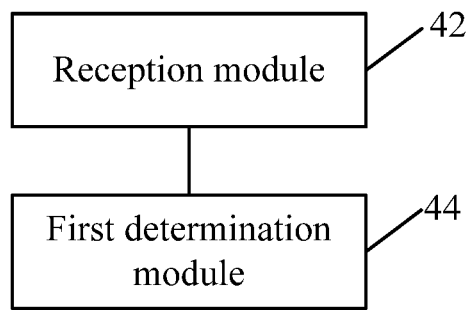
FIG. 4 is a structural block diagram one of a device for determining precoding according to an embodiment of the disclosure.

FIG. 4 is a structural block diagram one of a device for determining precoding according to an embodiment of the disclosure. As shown in FIG. 4, the device includes a reception module 42 and a first determination module 44.

The reception module 42 is configured to receive a PMI sent by a second communication node.

The first determination module 44 is configured to determine a precoding matrix used on a control channel according to the PMI and a precoding parameter.

The precoding parameter includes at least one of: a PMI delay, the number of repetitions of the control channel, an aggregation level of the control channel, a candidate resource of the control channel, a starting PRB sequence number of the control channel, a repetition resource group of the control channel, or a PRB set of the control channel.

It is to be noted that each module described above may be implemented by software or hardware. Implementation by hardware may, but may not necessarily, be performed in the following manners: the various modules described above are located in the same processor, or each module described above is located in their respective processors in any combination form.

Embodiment Five

This embodiment further provides a device for detecting data. The device is used for implementing the above-mentioned embodiments and exemplary implementations. What has been described will not be repeated. As used below, the term "module" may be software, hardware, or a combination thereof capable of implementing predetermined functions. The device in the embodiment described below is preferably implemented by software, but the implementation by hardware or by a combination of software and hardware is also possible and conceivable.

Figure 5:
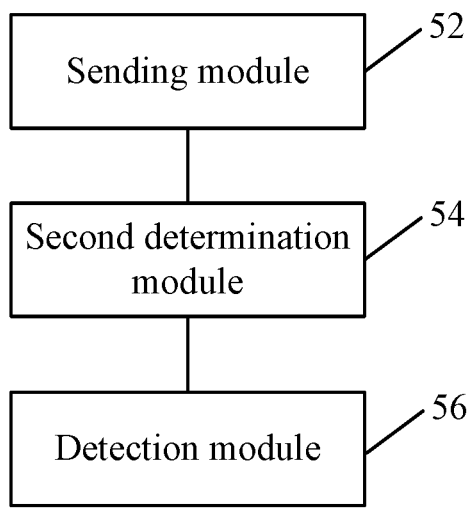
FIG. 5 is a structural block diagram of a device for detecting data according to an embodiment of the present disclosure.

FIG. 5 is a structural block diagram of a device for detecting data according to an embodiment of the present disclosure. As shown in FIG. 5, the device includes a sending module 52, a second determination module 54, and a detection module 56.

The sending module 52 is configured to send a PMI to a first communication node.

The second determination module 54 is configured to determine a precoding matrix used on a control channel according to the PMI and a precoding parameter.

The detection module 56 is configured to detect data of the control channel according to the precoding matrix.

The precoding parameter includes at least one of: a PMI delay, the number of repetitions of the control channel, an aggregation level of the control channel, a candidate resource of the control channel, a starting PRB sequence number of the control channel, a repetition resource group of the control channel, or a PRB set of the control channel.

It is to be noted that each module described above may be implemented by software or hardware. Implementation by hardware may, but may not necessarily, be performed in the following manners: the various modules described above are located in the same processor, or each module described above is located in their respective processors in any combination form.

Embodiment Six

This embodiment further provides a device for determining precoding. The device is used for implementing the above-mentioned embodiments and exemplary implementations. What has been described will not be repeated. As used below, the term "module" may be software, hardware, or a combination thereof capable of implementing predetermined functions. The device in the embodiment described below is preferably implemented by software, but the implementation by hardware or by a combination of software and hardware is also possible and conceivable.

Figure 6:
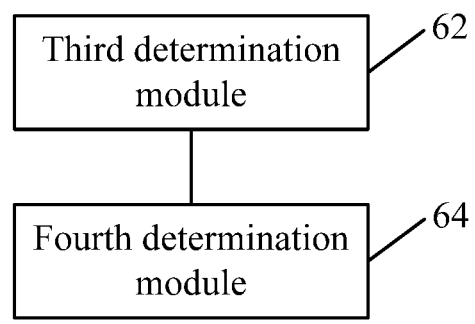
FIG. 6 is a structural block diagram two of a device for determining precoding according to an embodiment of the disclosure.

FIG. 6 is a structural block diagram two of a device for determining precoding according to an embodiment of the disclosure. As shown in FIG. 6, the device includes a third determination module 62 and a fourth determination module 64.

The third determination module 62 is configured to determine a precoding codebook set.

The fourth determination module 64 is configured to determine, based on the precoding codebook set, a precoding codebook of a physical channel according to at least one of: an RNTI, a cell ID, a DMRS port, a PRB index, a subframe index, or the number of repetitions of the physical channel. The precoding codebook of the physical channel is a codebook in the precoding codebook set.

It is to be noted that each module described above may be implemented by software or hardware. Implementation by hardware may, but may not necessarily, be performed in the following manners: the various modules described above are located in the same processor, or each module described above is located in their respective processors in any combination form.

Embodiment Seven

An embodiment of the present application further provides a storage medium. The storage medium is configured to store a computer program which, when executed, is configured to perform the steps in any one of the method embodiments described above.

In this embodiment, the preceding storage medium may be configured to store a computer program for performing the steps described below.

In S1, a first communication node receives a PMI sent by a second communication node.

In S2, a precoding matrix used on a control channel is determined according to the PMI and a precoding parameter.

The precoding parameter includes at least one of: a PMI delay, the number of repetitions of the control channel, an aggregation level of the control channel, a candidate resource of the control channel, a starting PRB sequence number of the control channel, a repetition resource group of the control channel, or a PRB set of the control channel.

Alternatively, the preceding storage medium may be configured to store a computer program for performing the steps described below.

In S1, a second communication node sends a PMI to a first communication node.

In S2, the second communication node determines a precoding matrix used on a control channel according to the PMI and a precoding parameter.

In S3, the second communication node detects data of the control channel according to the precoding matrix.

The precoding parameter includes at least one of: a PMI delay, the number of repetitions of the control channel, an aggregation level of the control channel, a candidate resource of the control channel, a starting PRB sequence number of the control channel, a repetition resource group of the control channel, or a PRB set of the control channel.

Alternatively, the preceding storage medium may be configured to store a computer program for performing the steps described below.

A precoding codebook set is determined.

A precoding codebook of a physical channel is determined based on the precoding codebook set according to at least one of: an RNTI, a cell ID, a DMRS port, a PRB index, a subframe index, or the number of repetitions of the physical channel, where the precoding codebook of the physical channel is a codebook in the precoding codebook set.

In an embodiment, in this embodiment, the storage medium may include, but is not limited to, a USB flash disk, a ROM, a RAM, a mobile hard disk, a magnetic disk, an optical disk or another medium capable of storing a computer program.

Embodiment Eight

An embodiment of the present application further provides an electronic device. The electronic device includes a memory and a processor, the memory is configured to store a computer program, and the processor is configured to execute the computer program to perform the steps in any one of the method embodiments described above.

In an embodiment, the preceding electronic device may further include a transmission device and an input/output device. The transmission device is connected to the preceding processor. The input/output device is connected to the preceding processor.

In an embodiment, in this embodiment, the preceding processor may be configured to execute the steps below through the computer program.

In S1, a first communication node receives a PMI sent by a second communication node.

In S2, a precoding matrix used on a control channel is determined according to the PMI and a precoding parameter.

The precoding parameter includes at least one of: a PMI delay, the number of repetitions of the control channel, an aggregation level of the control channel, a candidate resource of the control channel, a starting PRB sequence number of the control channel, a repetition resource group of the control channel, or a PRB set of the control channel.

Alternatively, the preceding processor may be configured to execute the steps below through the computer program.

In S1, a second communication node sends a PMI to a first communication node.

In S2, the second communication node determines a precoding matrix used on a control channel according to the PMI and a precoding parameter.

In S3, the second communication node detects data of the control channel according to the precoding matrix.

The precoding parameter includes at least one of: a PMI delay, the number of repetitions of the control channel, an aggregation level of the control channel, a candidate resource of the control channel, a starting PRB sequence number of the control channel, a repetition resource group of the control channel, or a PRB set of the control channel.

Alternatively, the preceding processor may be configured to execute the steps below through a computer program.

A precoding codebook set is determined.

A precoding codebook of a physical channel is determined based on the precoding codebook set according to at least one of: an RNTI, a cell ID, a DMRS port, a PRB index, a subframe index, or the number of repetitions of the physical channel, where the precoding codebook of the physical channel is a codebook in the precoding codebook set.

In an embodiment, for the examples in this embodiment, reference may be made to the examples described in the preceding embodiments and exemplary implementations, and details are not described in this embodiment.

Apparently, it is to be understood by those skilled in the art that the modules or steps of the present application may be implemented by a generic computing device and may be concentrated on a single computing device or distributed in a network formed by multiple computing devices. Alternatively, these modules or steps may be implemented by program codes executable by the computing device. Thus, these modules or steps may be stored in a storage medium and executed by the computing device. Moreover, in some cases, the illustrated or described steps may be executed in a sequence different from the sequence described herein. Alternatively, each of these modules or steps may be implemented by being made into an integrated circuit module or multiple ones of these modules or steps may be implemented by being made into a single integrated circuit module. In this manner, the present application is not limited to any combination of hardware and software.

What is claimed is:

1. A communication method, comprising:
    sending, by a second communication node, a precoding matrix indicator (PMI) to a first communication node;
    determining, by the second communication node, a precoding matrix used on a control channel according to the PMI and a precoding parameter, wherein the precoding parameter comprises at least one of: a PMI delay, an aggregation level of the control channel, a candidate resource of the control channel, or a physical resource block (PRB) set of the control channel;
    detecting, by the second communication node, the control channel according to the precoding matrix;
    determining, by the second communication node, an aggregation level set according to a configuration of the PRB set of the control channel;
    determining, in response to the aggregation level of the control channel not belonging to the aggregation level set, that the precoding matrix used on the control channel corresponds to a latest PMI sent by the second communication node; and
    determining, in response to the aggregation level of the control channel belonging to the aggregation level set, that the precoding matrix is predefined on the control channel.

2. The method of claim 1, further, comprising:
    determining a precoding codebook set; and
    determining the precoding matrix used on the control channel in the precoding codebook set according to at least one of: a PRB index into the PRB set or a subframe index.

3. The method of claim 2, wherein a number of ports of a cell-specific reference signal (CRS) associated with the precoding codebook set is 4, and the precoding codebook set contains four precoding matrices.

4. The method of claim 2, wherein a number of ports of a cell-specific reference signal (CRS) associated with the precoding codebook set is 2, the precoding codebook set contains two precoding matrices, and an angular difference of vector directions of the two precoding matrices is pi.

5. A non-transitory storage medium, storing a computer program, when executed, cause a communication device to perform the steps of claim 1.

6. An electronic device, comprising a memory and a processor, wherein the memory is configured to store a computer program, and the processor is configured to execute the computer program to perform steps comprising:
    sending, by a second communication node, a precoding matrix indicator (PMI) to a first communication node;
    determining, by the second communication node, a precoding matrix used on a control channel according to the PMI and a precoding parameter, wherein the precoding parameter comprises at least one of: a PMI delay, an aggregation level of the control channel, a candidate resource of the control channel, or a physical resource block (PRB) set of the control channel;
    detecting, by the second communication node, the control channel according to the precoding matrix;

determining, by second communication node, an aggregation level set according to a configuration of the PRB set of the control channel;
determining, in response to the aggregation level of the control channel not belonging to the aggregation level set, that the precoding matrix used on the control channel corresponds to a latest PMI sent by the second communication node; and
determining, in response to the aggregation level of the control channel belonging to the aggregation level set, that the precoding matrix is predefined on the control channel.

7. The electronic device of claim 6, wherein the processor is further configured to execute the computer program to perform steps comprising:
determining a precoding codebook set; and
determining a precoding matrix used on the control channel in the precoding codebook set according to at least one of: a PRB index into the PRB set or a subframe index.

8. The electronic device of claim 7, wherein a number of ports of a cell-specific reference signal (CRS) associated with the precoding codebook set is 4, and the precoding codebook set contains four precoding matrices.

9. The electronic device of claim 7, wherein a number of ports of a cell-specific reference signal (CRS) associated with the precoding codebook set is 2, the precoding codebook set contains two precoding matrices, and an angular difference of vector directions of the two precoding matrices is pi.

10. A communication method, comprising:
receiving, by a first communication node, a precoding matrix indicator (PMI) from a second communication node, wherein:
the PMI and a precoding parameter is used, by the second communication node, to determine a precoding matrix used on a control channel, wherein the precoding parameter comprises at least one of: a PMI delay, an aggregation level of the control channel, a candidate resource of the control channel, or a physical resource block (PRB) set of the control channel; and
the precoding matrix is used, by the second communication node, to detect the control channel according to the precoding matrix;
determining, in response to the aggregation level of the control channel not belonging to an aggregation level set, that the precoding matrix used on the control channel corresponds to a latest PMI sent by the second communication node, wherein the aggregation level set is determined according to a configuration of the PRB set of the control channel; and
determining, in response to the aggregation level of the control channel belonging to the aggregation level set, that the precoding matrix is predefined on the control channel.

11. The method of claim 10, further, comprising:
determining a precoding codebook set; and
determining a precoding matrix used on the control channel in the precoding codebook set according to at least one of: a PRB index into the PRB set or a subframe index.

12. The method of claim 11, wherein a number of ports of a cell-specific reference signal (CRS) associated with the precoding codebook set is 4, and the precoding codebook set contains four precoding matrices.

13. The method of claim 11, wherein a number of ports of a cell-specific reference signal (CRS) associated with the precoding codebook set is 2, the precoding codebook set contains two precoding matrices, and an angular difference of vector directions of the two precoding matrices is pi.

14. An electronic device, comprising a memory and a processor, wherein the memory is configured to store a computer program, and the processor is configured to execute the computer program to perform steps of claim 10.

15. The electronic device of claim 14, wherein the processor is further configured to execute the computer program to perform steps comprising:
determining a precoding codebook set; and
determining a precoding matrix of the control channel in the precoding codebook set according to at least one of: a PRB index into the PRB set or a subframe index.

16. The electronic device of claim 14, wherein a number of ports of a cell-specific reference signal (CRS) associated with the precoding codebook set is 4, and the precoding codebook set contains four precoding matrices.

17. The electronic device of claim 14, wherein a number of ports of a cell-specific reference signal (CRS) associated with the precoding codebook set is 2, the precoding codebook set contains two precoding matrices, and an angular difference of vector directions of the two precoding matrices is pi.

18. A non-transitory storage medium, storing a computer program, when executed, cause a communication device to perform the steps of claim 10.

* * * * *

UNITED STATES PATENT AND TRADEMARK OFFICE
CERTIFICATE OF CORRECTION

PATENT NO. : 11,424,806 B2
APPLICATION NO. : 17/388939
DATED : August 23, 2022
INVENTOR(S) : Luanjian Bian et al.

Page 1 of 1

It is certified that error appears in the above-identified patent and that said Letters Patent is hereby corrected as shown below:

In the Claims

Column 27, Claim 7, Line 17, delete "a precoding matrix" and insert in its place --the precoding matrix--.

Column 27, Claim 10, Line 35, delete "is used" and insert in its place --are used--.

Column 28, Claim 11, Line 11, delete "a precoding matrix" and insert in its place --the precoding matrix--.

Column 28, Claim 15, Line 32, delete "a precoding matrix" insert in its place --the precoding matrix--.

Signed and Sealed this
Twenty-eighth Day of May, 2024

Katherine Kelly Vidal
*Director of the United States Patent and Trademark Office*